(12) United States Patent
Graefling et al.

(10) Patent No.: US 11,270,463 B2
(45) Date of Patent: Mar. 8, 2022

(54) DYNAMIC THREE-DIMENSIONAL IMAGING DISTANCE SAFEGUARD

(71) Applicant: Infineon Technologies AG, Neubiberg (DE)

(72) Inventors: Martin Graefling, Graz (AT); Harald Sporer, Graz (AT)

(73) Assignee: Infineon Technologies AG, Neubiberg (DE)

( * ) Notice: Subject to any disclaimer, the term of this patent is extended or adjusted under 35 U.S.C. 154(b) by 442 days.

(21) Appl. No.: 16/425,350

(22) Filed: May 29, 2019

(65) Prior Publication Data
US 2020/0380726 A1 Dec. 3, 2020

(51) Int. Cl.
*G06T 7/80* (2017.01)
*H04N 17/00* (2006.01)
*G06T 7/00* (2017.01)
*G06T 7/50* (2017.01)

(52) U.S. Cl.
CPC .............. *G06T 7/80* (2017.01); *G06T 7/0002* (2013.01); *G06T 7/50* (2017.01); *G06T 7/97* (2017.01); *H04N 17/002* (2013.01); *G06T 2207/30168* (2013.01); *G06T 2207/30268* (2013.01)

(58) Field of Classification Search
CPC ........... G06T 7/0002; G06T 7/80; G06T 7/50; G06T 7/97; G06T 2200/04; G06T 2207/10028; G06T 2207/30168; G06T 2207/30232; G06T 2207/30268; G06T 2207/10016; H04N 17/002
See application file for complete search history.

(56) References Cited

U.S. PATENT DOCUMENTS

| | | | | |
|---|---|---|---|---|
| 2010/0166261 A1* | 7/2010 | Tsuji | .................... | G06K 9/4652 382/103 |
| 2012/0249738 A1* | 10/2012 | Gilboa | .................... | G01S 7/497 348/46 |
| 2015/0304648 A1 | 10/2015 | Gulati et al. | | |
| 2018/0081426 A1 | 3/2018 | Rothkopf | | |

FOREIGN PATENT DOCUMENTS

| | | | |
|---|---|---|---|
| DE | 102005058240 A1 | 6/2007 | |
| DE | 102014206623 A1 | 10/2015 | |
| DE | 102014225797 A1 | 6/2016 | |

\* cited by examiner

*Primary Examiner* — Brenda C Bernardi
(74) *Attorney, Agent, or Firm* — Harrity & Harrity, LLP

(57) ABSTRACT

A monitoring component may select a reference area, associated with an environment of an imaging system, based on a three-dimensional (3D) image obtained by the imaging system. The monitoring component may determine a reference image corresponding to the reference area. The reference image may be determined based on design data associated with the environment of the imaging system. The monitoring component may perform, based on the 3D image and the reference image, a functional safety check to determine a functional safety status associated with the imaging system. The monitoring component may selectively provide a signal based on the determined functional safety state.

20 Claims, 6 Drawing Sheets

DYNAMIC THREE-DIMENSIONAL IMAGING DISTANCE SAFEGUARD

BACKGROUND

An imaging system may be capable of determining distances to respective points in an environment of the imaging system, and a three-dimensional (3D) image can be generated based on the distances to the respective points. For example, a time-of-flight (ToF) based imaging system may determine distances to respective points in an environment based on an amount of time needed for a modulated optical signal, emitted by an emission source of the ToF-based imaging system, to be reflected back to an array of photosensitive pixels of the imaging system. Here, the amount of time is derived from a reflected modulated optical signal received at pixels of the array of photosensitive pixels. These amounts of time are translated to distances from which the 3D image can be generated. Other types of imaging systems capable of determining distances in association with generating a 3D image include, for example, a stereo camera, a LiDAR system, and the like.

SUMMARY

According to some implementations, a method may include obtaining, by an imaging system, a 3D image associated with an environment of the imaging system; selecting a reference area, associated with the environment of the imaging system, based on the 3D image; determining a reference image corresponding to the reference area, wherein the reference image is determined based on design data associated with the environment of the imaging system; performing, based on the 3D image and the reference image, a functional safety check to determine a functional safety status associated with the imaging system; and selectively providing a signal based on the determined functional safety state.

According to some implementations, a monitoring component may include one or more processors to: obtain an image associated with an environment of a 3D imaging system; select a reference area, associated with the environment of the 3D imaging system, based on the image; generate, based on design data associated with the environment of the 3D imaging system, a reference image corresponding to the reference area; perform, based on the image and the reference image, a functional safety check to determine a functional safety status associated with the 3D imaging system; and selectively provide a signal based on the determined functional safety status.

According to some implementations, a system may include an imaging system to generate an image associated with an environment of the imaging system; and a monitoring component to: select, based on the image, a reference area associated with the environment of the imaging system; determine design data associated with the environment of the imaging system; determine, based on the design data, a reference image corresponding to the reference area; perform, based on the image and the reference image, a functional safety check to determine a functional safety status associated with the imaging system; and selectively provide a signal based on the determined functional safety status.

DETAILED DESCRIPTION

Figure 1A:
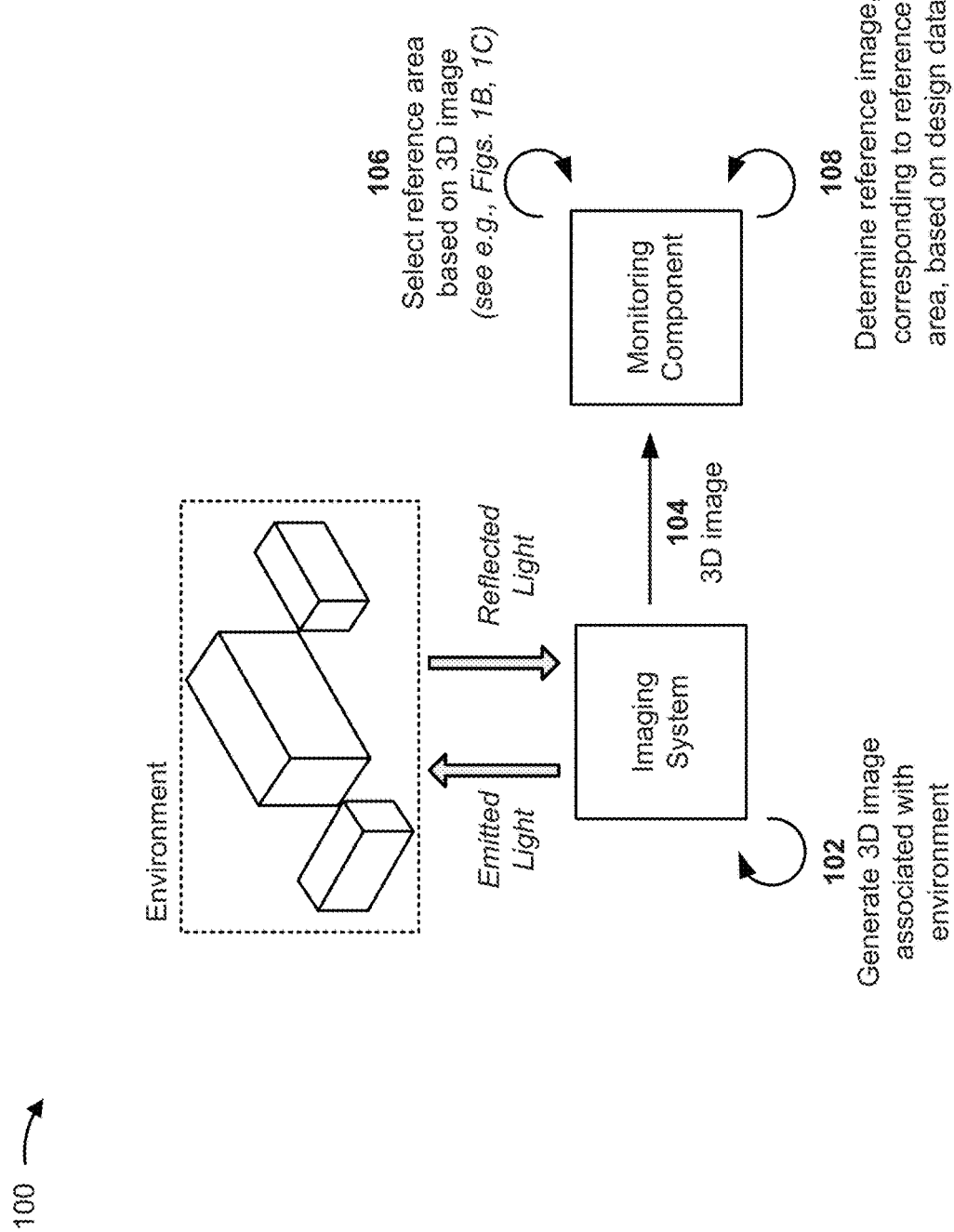
FIGS. 1A-1D are diagrams associated with an example implementation described herein.

The following detailed description of example implementations refers to the accompanying drawings. The same reference numbers in different drawings may identify the same or similar elements.

An imaging system may be used in an application that requires compliance with a particular safety standard and/or that calls for ensuring functional safety of the imaging system. For example, an imaging system may be used in an automotive application that requires compliance with International Organization for Standardization (ISO) standard 26262. In such a case, and in other applications, monitoring an entire signal path (e.g., including an optical signal path and an electrical signal path) of the imaging system may be needed. Generally, monitoring of safety-related imaging system elements is needed due to potential problems with components of the imaging system (e.g., electronic components or optical components), such as parametric drift after calibration, random hardware faults, and/or the like. Conventional approaches for assessing functional safety provide monitoring of the electrical signal path only, for example, starting with diagnosis at an electrical signal (e.g., a voltage signal or a current signal) output of a light sensitive sensor element (e.g., a pixel array).

Some implementations described herein provide a monitoring component capable of performing a functional safety check in association with monitoring an entire signal path of an imaging system (i.e., monitoring that encompasses an optical signal path and an electrical signal path). In some implementations, the monitoring component may determine a reference image corresponding to a reference area associated with a 3D image generated by the imaging system, and may perform a functional safety check based on the 3D image and the reference image. In some implementations, the reference image may be determined based on design data associated with the environment of the imaging system. Additional details regarding the operation of the monitoring component are provided below.

In some implementations, the monitoring component described herein provides high diagnostic coverage related to various failure modes, meaning that the monitoring component provides diagnostic coverage for the entire signal path such that various possible failure modes (e.g., in different parts of the imaging system) are detectable. Furthermore, the monitoring component described herein enables numerous safety mechanisms. For example, the monitoring component may enable detection of a hardware fault of the imaging system (e.g., including cluster faults within a pixel array). As another example, the monitoring component may enable detection of a drift associated with the imaging system (e.g., a lifetime drift, a temperature drift, and/or the like) and may, in some implementations, provide drift correction. As another example, the monitoring component may enable detection of a geometric misalignment (e.g., caused by a movement of the imaging system) and may, in some implementations, provide misalignment correction. As another example, the monitoring component may enable detection of a transient hardware fault (e.g., caused by electromagnetic interference). Additionally, the monitoring component may enable (continuous or near-continuous) calibration of the imaging system during operation.

FIGS. 1A-1D are diagrams associated with an example implementation 100 described herein. In example implementation 100, an imaging system is positioned such that the imaging system can capture a three-dimensional (3D) image of an environment associated with the imaging system (e.g., an area around or near the imaging system). For example, in an automotive context, the imaging system may be a driver monitoring camera mounted on a dashboard of a vehicle, an occupant monitoring camera mounted on a roof or a mirror of a vehicle, a gesture recognition camera installed in an infotainment system of a vehicle, or the like.

As shown in FIG. 1A, and by reference number 102, the imaging system may generate a 3D image associated with the environment of the imaging system. For example, an emitter component of the imaging system (e.g., an emitter component of the imaging system) may emit a modulated optical signal (e.g., light, such as infrared light) to illuminate the environment of the imaging system. As shown in FIG. 1A, the emitted light may be reflected from the environment of the imaging system such that the imaging system (e.g., an array of photosensitive pixels) receives a reflected modulated optical signal. Here, a given photosensitive pixel in the array may convert a respective received portion of the received reflected modulated optical signal into an electrical signal. The electrical signals may then be processed (e.g., by a system controller and/or by one or more components of the imaging system) to generate the 3D image. In some implementations, the electrical signals provided by the pixels may be used to determine distances from the imaging system to points within the environment of the imaging system, and the 3D image can be generated based on mapping these distances to associated pixels in the array. In some implementations, the 3D image may be generated by a system controller associated with the imaging system (e.g., a system controller included in the imaging system or separate from the imaging system).

As shown by reference number 104, a monitoring component may obtain the 3D image associated with the environment of the imaging system. The monitoring component includes a component capable of performing, based on a 3D image and a reference image associated with the environment of the imaging system, a functional safety check in association with determining a functional safety status associated with the imaging system, as described herein. In some implementations, when the imaging system generates the 3D image, the imaging system may provide the 3D image to the monitoring component. Additionally, or alternatively, when a component of the system controller generates the 3D image, the system controller may provide the 3D image to the monitoring component. In some implementations, the monitoring component may be a component of the system controller.

As shown by reference number 106, the monitoring component may select a reference area, associated with the environment of the imaging system, based on the 3D image. A reference area is an area within the environment of the 3D image that is to be compared to a corresponding reference image in association with performing a functional safety check for the imaging system. As described in further detail below, the reference image may be an image of a portion of the environment of the imaging system where no objects are present. In other words, the reference image may be an image of a portion of the environment that includes only features of the environment (e.g., features that define the environment).

In some implementations, the monitoring component may select the reference area from one or more candidate reference areas (e.g., one or more potential reference areas). Therefore, in association with selecting the reference area, the monitoring component may identify a candidate reference area. In some implementations, the monitoring component may identify the candidate reference area based on information associated with a set of reference areas configured on the monitoring component. For example, the monitoring component may be configured with information associated with a set of candidate reference areas (e.g., information that defines boundaries for each of a set of candidate reference areas for the environment).

In some implementations, when selecting the reference area, the monitoring component may determine whether a candidate reference area is obstructed in the 3D image. For example, the monitoring component may perform object detection to determine whether an object is present such that the object at least partially obstructs the candidate reference area (e.g., such that a portion of one or more features of the environment is blocked in the 3D image). In some implementations, in association with performing object detection, the monitoring component may perform segmentation of the 3D image (e.g., to divide or partition the 3D image into segments), edge detection, and/or one or more other image processing operations. For example, the monitoring component may segment the 3D image, and may perform object detection based on segments generated from the segmentation to determine whether an object is present in the candidate reference area such that the candidate reference area is obstructed.

In some implementations, if a result of the object detection indicates that no object is present in the candidate reference area (i.e., that the candidate reference area of the environment is not obstructed), then the monitoring component may select the reference area as including at least a portion of the unobstructed candidate reference area. Conversely, if a result of the object detection indicates that an object is present in a candidate reference area (i.e., that a first candidate reference area is obstructed), then the monitoring component may determine, based on performing object detection, whether another candidate reference area is obstructed. Here, if a result of the object detection indicates that no object is present in the other candidate reference area (i.e., that a second candidate reference area is not obstructed), then the monitoring component may select the reference area as including at least a portion of the unobstructed second candidate reference area. In some implementations, when the monitoring component determines that a first candidate reference area is obstructed, the monitoring component may identify a second candidate reference area that is adjacent to (e.g., neighboring, closest to, or the like) the object detected in the first candidate reference area.

In some implementations, when selecting the reference area, the monitoring component may perform object detection on the 3D image (e.g., the entire 3D image), and may identify a candidate reference area in which no object is detected within the environment of the imaging system. For example, the monitoring component may be configured with information associated with a set of candidate reference areas and, after performing object detection on the 3D image, may identify a candidate reference area, from the set of candidate reference areas, that is not obstructed by any object. Here, the monitoring component may select the reference area as including at least a portion of the candidate reference area. In such an implementation, delay associated with selecting the reference area may be minimized (e.g., since the monitoring component needs only to perform one iteration of object detection).

In some implementations, the monitoring component may select the candidate reference area and then perform object detection within the candidate reference area only. For example, the monitoring component may be configured with information associated with a set of candidate reference areas, and may identify (e.g., based on a random selection, based on a configured prioritization, based on a previously used reference area, and/or the like) a candidate reference area for which object detection is to be performed. The monitoring component may then perform object detection on a portion of the 3D image that corresponds to the candidate reference area. Here, if the monitoring component does not detect an object in the candidate reference area, then the monitoring component may select the reference area as including at least a portion of the candidate reference area. However, if the monitoring component detects an object in the candidate reference area, then the monitoring component may identify another candidate reference area (e.g., based on a random selection, based on a configured prioritization, based on the obstructed candidate reference area, and/or the like), and perform object detection associated with the other reference area. In other words, in some implementations, the monitoring component may perform object detection for multiple candidate reference areas in a sequential manner (e.g., such that the monitoring component determines whether candidate reference areas are obstructed one at a time). In such an implementation, an amount of processing resources consumed in association with selecting the reference area may be reduced (e.g., since object detection may need to be performed for only a portion of the 3D image).

In some implementations, when selecting the reference area, the monitoring component may perform object detection associated with multiple candidate reference areas (e.g., such that the monitoring component concurrently determines whether each of multiple candidate reference areas is obstructed). Here, the monitoring component may identify one or more unobstructed candidate reference areas based on the object detection, and may select (e.g., based on a random selection, based on a configured prioritization, and/or the like) the reference area from the one or more unobstructed candidate reference areas.

Using any of the techniques described above, the monitoring component may select the reference area in a flexible manner. Put another way, the reference area to be used for the purpose of performing the functional safety check may be dynamically selected based on the presence of objects in the environment of the imaging system, thereby ensuring that the functional safety check can be performed regardless of the presence of objects in the environment of the imaging system. Further, using the above described techniques, the monitoring component can dynamically and flexibly select different reference areas as an object moves within the environment of the imaging system. For example, when the monitoring component performs a first iteration of the functional safety check based on a first reference area, and the first reference becomes obstructed by a moving object (e.g., after the first iteration of the functional safety check), the monitoring component can select a second reference area to be used in association with a second iteration of the functional safety check.

As shown by reference number 108, the monitoring component may determine a reference image corresponding to the reference area. The reference image is an image that is to be compared to a portion of the 3D image corresponding to the reference area for purposes of performing a functional safety check associated with the imaging system, In some implementations, the monitoring component may determine the reference image based on design data associated with the environment of the imaging system. For example, the monitoring component may have access to design data associated with the environment of the imaging system. The design data can include, for example, information that indicates distances from the imaging system to points located on features in the environment of the imaging system. Here, the monitoring component may determine the reference image based on the design data (e.g., by determining a 3D reference image from the design data). As a particular example, in the automotive context, the monitoring component may have access to design data (e.g., computer aided drafting (CAD) data) for an interior of a vehicle. The design data may include, for example, information that indicates distances from a location of the imaging system (e.g., a lens on a dashboard) to various points located on features in the environment points on door panels of the interior of the vehicle, points on seats within the interior of the vehicle, and/or the like). Here, the monitoring component may determine the reference image based on the design data by, for example, determining a 3D reference image from the design data.

In some implementations, the reference image may correspond to the reference area. For example, the monitoring component may determine the reference image based on information associated with the reference area (e.g., information that describes a boundary of the reference area). Here, a boundary of the reference image may match the boundary of the reference area (e.g., such that the monitoring component can compare the reference image and a portion of the 3D image corresponding to the reference area, as described below).

Figure 1B:
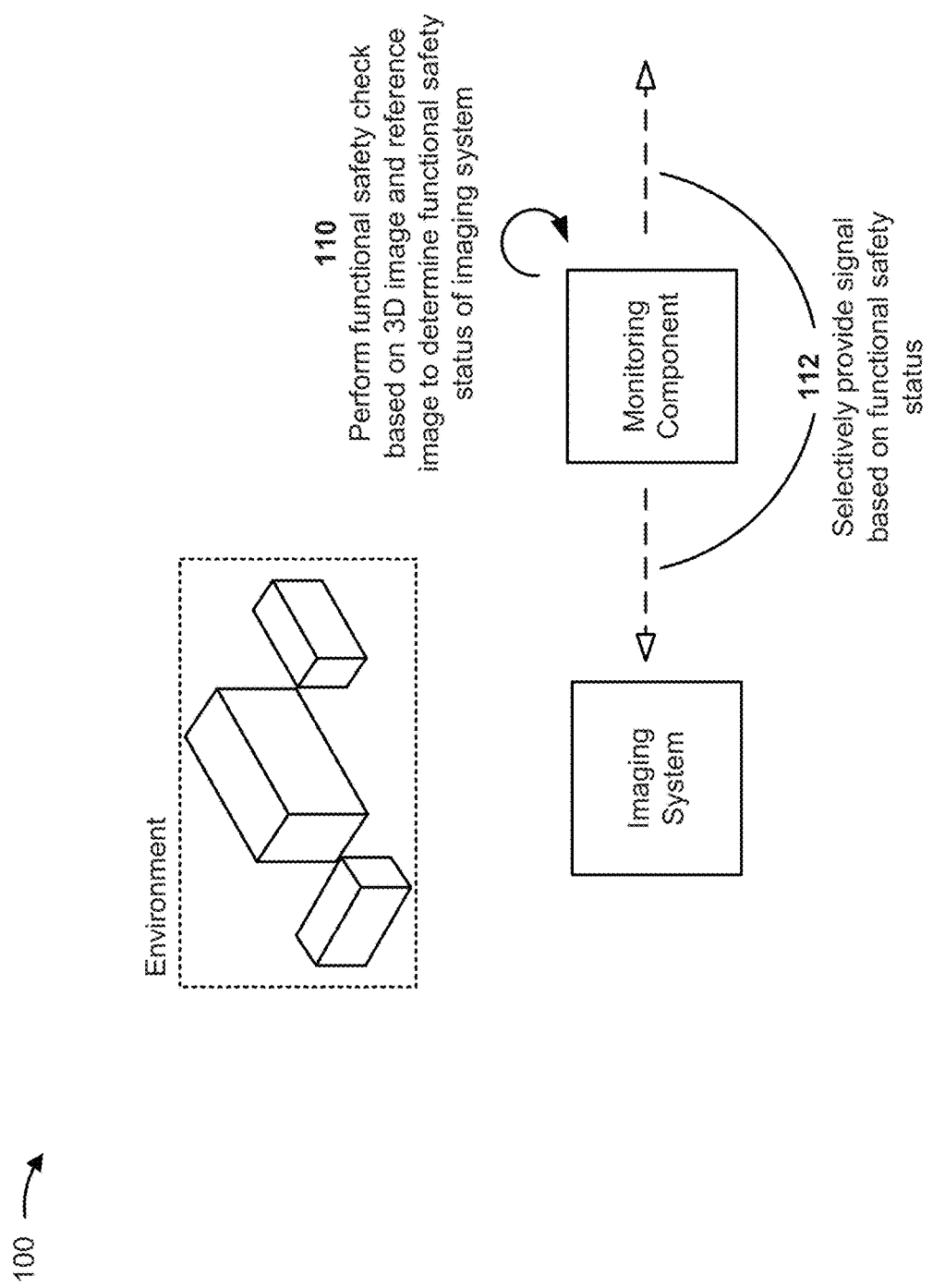

As shown in FIG. 1B, and by reference number 110, the monitoring component may perform, based on the 3D image and the reference image, a functional safety check to determine a functional safety status associated with the imaging system. The functional safety status may be a classification of a state in which the imaging system is operating with respect to functional safety (i.e., whether the imaging system is achieving functionally safe operation). The functional safety status may indicate, for example, that the imaging system has experienced a drift (e.g., a lifetime drift), has experienced a fault (e.g., a hardware fault, transient fault), has experienced a geometric misalignment (e.g., due to the imaging system itself being rotated, moved, shifted, or the like), is in need of calibration (e.g., to account for temperature, drift, a misalignment, or the like), is operating in a functionally safe state, or another type of functional safety classification.

In some implementations, when performing the functional safety check, the monitoring component may compare the reference image and a portion of the 3D image corresponding to the reference area, and may determine the functional safety status of the imaging system based on a result of comparing the reference image and the portion of the 3D image. For example, the monitoring component may identify a portion of the 3D image bounded by the selected reference area, and may compare the reference image and the portion of the 3D image.

In some implementations, when comparing the reference image and the portion of the 3D image, the monitoring component may identify a reference distance based on the reference image (e.g., a distance from the imaging system to a point in the reference area as indicated in the reference image), and may identify a corresponding measured distance based on the 3D image e.g., a distance from the imaging system to the point in the reference area as indicated in the 3D image). Here, the monitoring component may determine whether the reference distance matches the measured distance (e.g., within a tolerance). The monitoring component may perform this comparison for multiple points. In this example, if a number of comparisons resulting in distance mismatches (e.g., a difference between a reference distance and a respective measured distance that is outside of the tolerance) does not satisfy a threshold (e.g., is less than a mismatch threshold), then the monitoring component may determine the functional safety status as the imaging system operating in a functionally safe state. Conversely, if the number of comparisons resulting in distance mismatches satisfies the threshold (e.g., is greater than or equal to the mismatch threshold), then the monitoring component may determine the functional safety status as the imaging system not operating in a functionally safe state (e.g., as having experienced a fault, having experienced a drift, as being geometrically misaligned, as being in need of calibration, and/or the like). In some implementations, characteristics of one or more mismatches between the reference image and the portion of the 3D image corresponding to the reference area may be indicative of whether the imaging system has experienced a fault, has experienced a drift, is geometrically misaligned, is in need of calibration, or the like. Thus, in some implementations, the monitoring component may determine a functional safety status indicating a fault, a drift, a geometric misalignment, a need for calibration, and/or the like.

In some implementations, when the result of comparing the reference image and the first portion of the 3D image is not indicative of functionally safe operation (e.g., when the functional safety status is indicative of a fault, a drift, a geometric misalignment, a need for calibration, and/or the like), the monitoring component may perform another iteration of the above described operations (e.g., in order to confirm the previous result or identify the previous result as a false positive). For example, the monitoring component may select another reference area associated with the environment of the imaging system, determine a second reference image corresponding to the second reference area, and compare the second reference image and a second portion of the 3D image that corresponds to the second reference area. Here, the result of performing the functional safety check may be further based on a result of comparing the second reference image and the second portion of the 3D image. For example, when the result of comparing the second reference image and the second portion of the 3D image matches the result associated with the first iteration of the functional safety check, the monitoring component may confirm the functional safety status as determined in association with the first reference area. Conversely, when the result of comparing the second reference image and the second portion of the 3D image does not match the result associated with the first iteration of the functional safety check, the monitoring component may perform one or more further iterations (e.g., based on one or more respective other reference areas) in order to confirm the functional safety status (e.g., when one or more other comparisons are indicative of the same fault, drift, geometric misalignment, need for calibration, and/or the like) or identify the initial result as a false positive (e.g., when one or more other comparisons are not indicative of the same fault, drift, geometric misalignment, need for calibration, and/or the like).

As shown by reference 112, in some implementations, the monitoring component may selectively provide a signal based on the determined functional safety status. For example, when the functional safety status does not indicate a fault associated with the imaging system, the monitoring component may provide (e.g., to a controller associated with the imaging system) a signal indicating that the imaging system has passed the functional safety check (e.g., that he imaging system is operating in a functionally safe state). As another example, when the functional safety status does not indicate a fault associated with the imaging system, the monitoring component may refrain from providing a signal (e.g., when the monitoring component is configured to provide a signal only when a fault is detected). As another example, when the functional safety status indicates a fault associated with the imaging system, the monitoring component may provide a signal indicating that the imaging system has failed the functional safety check (e.g., that the imaging system is not operating in a functionally safe state). Signals may be provided in a similar manner in association with a detection of drift, a geometric misalignment, a need for calibration, and/or the like.

In some implementations, when the functional safety status is indicative of drift associated with the imaging system, the monitoring component may perform drift correction associated with the imaging system (e.g., in order to correct an effect of the drift from 3D images generated by the imaging system). In such a case, the monitoring component may provide, to the imaging system, one or more signals associated with performing drift correction to the imaging system.

In some implementations, when the functional safety status is indicative of a geometric misalignment associated with the imaging system, the monitoring component may perform a geometric misalignment correction associated with the imaging system (e.g., in order to correct an effect of the geometric misalignment from 3D images generated by the imaging system). In such a case, the monitoring component may provide, to the imaging system, one or more signals associated with performing misalignment correction to the imaging system.

In some implementations, when the functional safety status indicates a need for calibration of the imaging system, the monitoring component may calibrate the imaging system based on the functional safety status (e.g., for temperature, for geometric misalignment, for drift, and/or the like). In such a case, the monitoring component may provide, to the imaging system, one or more signals associated with calibrating the imaging system.

In some implementations, the monitoring component may perform one or more of the above described operations automatically on a periodic basis. In other words, the monitoring component may be configured to obtain a 3D image, select a reference area, determine a reference image, and perform a functional safety check on a regular (e.g., periodic, near-continuous, and/or the like) basis during operation of the imaging system. Alternatively, the monitoring component may perform the above described operations once during operation of the imaging system (e.g., at a startup of the imaging system).

In some implementations, the monitoring component may cause the environment of the imaging system to be modified in association with performing the functional safety check.

In such a case, the functional safety status may indicate whether the environment, after being modified, matches an expected environment of the imaging system. For example, the imaging system may be mounted on or near a robotic device. Here, the monitoring component may cause (e.g., by sending a signal to a controller of the robotic device) an arm of the robotic device to move to a particular position in the environment of the imaging system (e.g., such that the arm is in front of the imaging system at the particular position). Here, the imaging system may generate a 3D image and provide the 3D image to the monitoring component. In this example, the monitoring component may select the reference area as an area corresponding to a portion of the robotic arm, and may determine a reference image based on, for example, design data associated with the robotic arm and information associated with the particular position. The monitoring component may then perform the functional safety check to determine the functional safety status of the imaging system, as described above. In this example, the functional safety check may be further used to determine whether the robotic arm, after being caused to move by the monitoring component, is in the particular position (i.e., whether the robotic arm is in an expected position). Thus, in this example, the functional safety check may be used to determine a functional safety status of the robotic arm (e.g., whether the robotic arm is operating as expected).

Figure 1D:
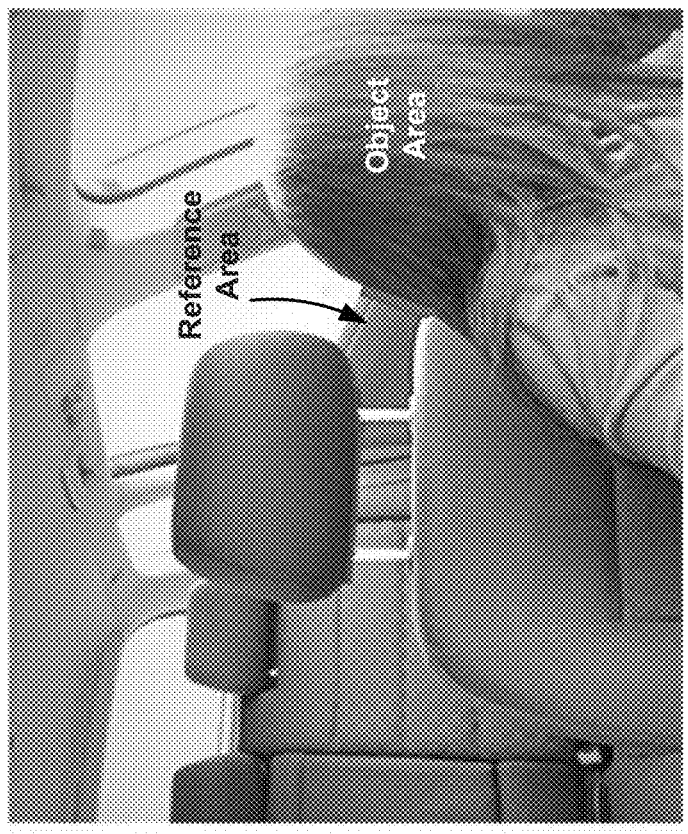
Figure 1C:

FIGS. 1C and 1D provide illustrative examples associated with performing the functional safety check in the manner described above. In FIGS. 1C and 1D, the imaging system is arranged in an interior of a vehicle (e.g., mounted on a dashboard, mounted on a mirror, installed in a console, and/or the like).

Starting with the example illustrated in FIG. 1C, the monitoring component may obtain a first 3D image associated with the environment of the imaging system (e.g., a first image of an interior of the vehicle on the driver side). The monitoring component may perform object detection on the first 3D image and, as a result, may detect an object in the environment of the imaging system (e.g., the driver). As shown in FIG. 1C, based on detecting the object, the monitoring component may select a first reference area in which no object is detected (e.g., other than features of the environment, such as a seat belt, a door panel, and so on). In some implementations, as illustrated in FIG. 1C, the monitoring component may select the first reference area as a portion of an unobstructed candidate reference area that is adjacent to the object which, in this example, is a portion of a candidate reference area including sections of front driver side panels on the interior of the vehicle. Next, the monitoring component may determine a first reference image based on design data associated with the interior of the vehicle. In this example, the first reference image may be an image corresponding to the portions of the front driver side panels in FIG. 1C. The monitoring component may then perform a first functional safety check based on the first reference image and a portion of the first 3D image corresponding to the first reference area (e.g., a portion of the first 3D image bounded by the first reference area).

Continuing with this example, assume that the monitoring component is to perform a second iteration of the functional safety check (e.g., at a later time). As illustrated in FIG. 1D, the monitoring component may obtain a second 3D image associated with the environment of the imaging system (e.g., a second image of the interior of the vehicle on the driver side). The monitoring component may perform object detection on the second 3D image and, as a result, may detect the object in the environment of the imaging system (e.g., the driver). However, as shown in FIG. 1D, the object is at a different location in the second 3D image (i.e., the driver moved). As shown in FIG. 1D, based on detecting the object, the monitoring component may select a second reference area in Which no object is detected (e.g., since the first reference area is now obstructed by the object). In this example, the monitoring component selects the second reference area as a portion of a candidate reference area including sections of rear driver side panels on the interior of the vehicle. Next, the monitoring component may determine a second reference image based on design data associated with the interior of the vehicle. In this example, the second reference image may be an image corresponding to the portions of the rear driver side panels in FIG. 1D. The monitoring component may then perform the second functional safety check based on the second reference image and a portion of the second 3D image corresponding to the second reference area (e.g., a portion of the second 3D image bounded by the second reference area).

As indicated above, FIGS. 1A-1D are provided merely as examples. Other examples may differ from what is described with regard to FIGS. 1A-1D.

Figure 2:
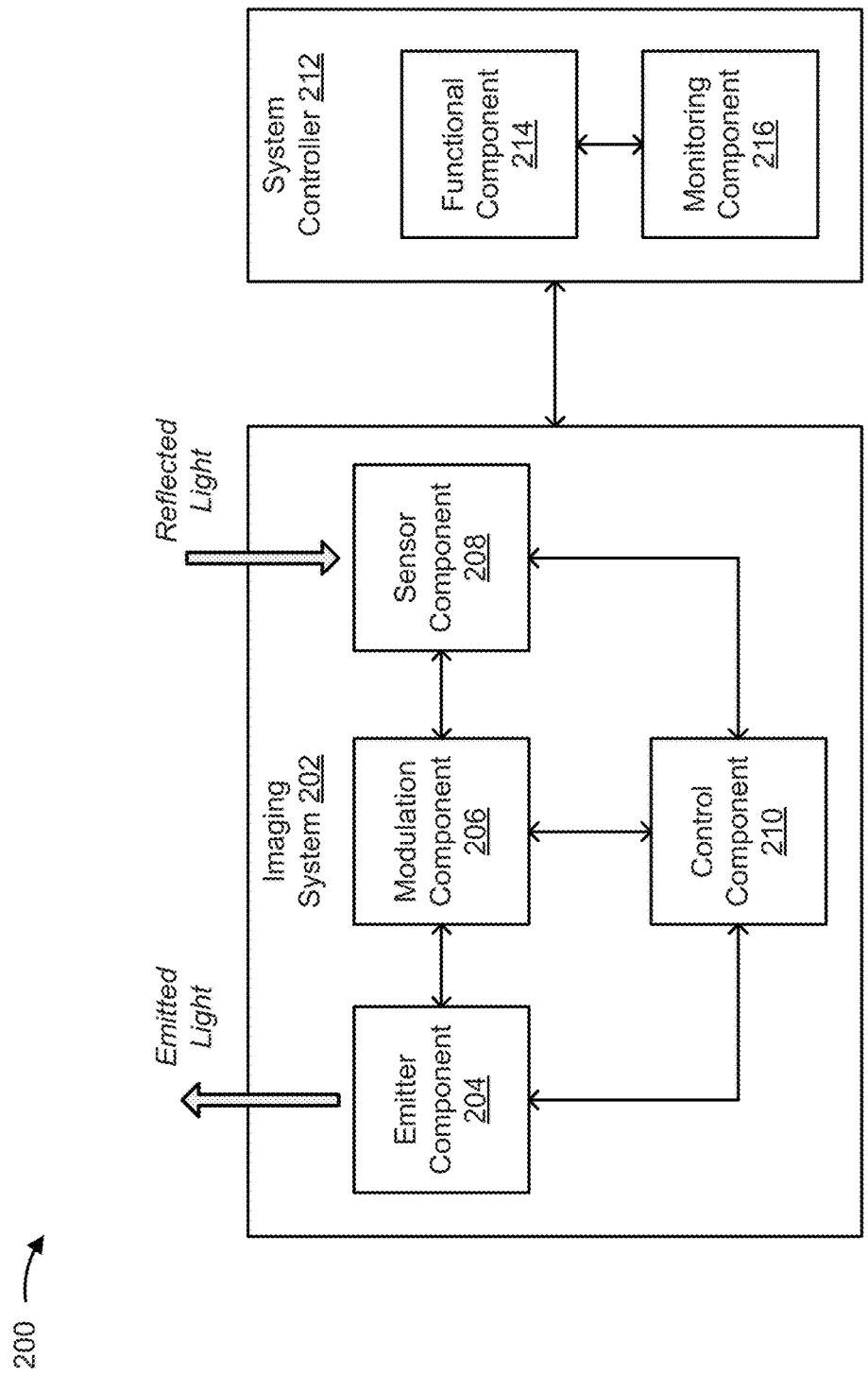
FIG. 2 is a diagram of an example environment in which systems and/or methods described herein may be implemented.

FIG. 2 is a diagram of an example domain 200 in which systems and/or methods described herein may be implemented. As shown in FIG. 2, domain 200 may include an imaging system 202 comprising an emitter component 204, a modulation component 206, a sensor component 208, and a control component 210. As further shown, domain 200 may include a system controller 212 comprising a functional component 214 and a monitoring component 216. Components and devices of domain 200 may interconnect via wired connections, wireless connections, or a combination of wired and wireless connections.

Imaging system 202 includes a system capable of determining information based on which a 3D image of an environment of imaging system 202 can be generated. In some implementations, imaging system 202 may be included in or arranged to image, for example, an interior of a vehicle (e.g., an automobile, a boat, an aircraft, or the like), an exterior of a vehicle, a robotic device, an item of equipment manufacturing equipment, industrial equipment), or another type of device. In some implementations, imaging system 202 may be a time-of-flight (ToF) based imaging system including emitter component 204, modulation component 206, sensor component 208, and control component 210. Notably, while imaging system 202 is illustrated and described as a ToF-based imaging system in domain 200, imaging system 202 may be another type of imaging system, such as a stereo camera, a LiDAR system, or another type of system capable of determining information based on which a 3D image can be generated.

Emitter component 204 includes a component to emit a modulated optical signal (e.g., light, such as infrared light). In some implementations, emitter component 204 includes a light emitter, such as a light-emitting diode (LED), a laser emitter, and/or the like. In some implementations, emitter component 204 may be capable of emitting a modulated optical signal in order to illuminate an environment (e.g., a predetermined area) of imaging system 202 in which distances to objects or environmental elements are to be determined in association with generating a 3D image. Additionally, or alternatively, emitter component 204 may be capable of emitting a modulated optical signal in order to illuminate the environment in pulses, stages, scans, and/or the like. In various implementations, different forms of optical signals may be emitted from emitter component 204. For example, the modulated optical signal may include one or more modulated light pulses. In some implementations, emitter component 204 may be switched on for a short interval, allowing the modulated optical signal to illuminate an area, including any objects within the area.

Modulation component 206 includes a component associated with modulating an optical signal to form the modulated optical signal emitted by emitter component 204. In some implementations, modulation component 206 causes the optical signal to be modulated based on a modulation signal (e.g., a signal that identifies a frequency at which emitter component 204 is to switch the illumination source on and off). In some implementations, modulation component 206 may be capable of modulating one or more photosensitive pixels of sensor component 208 in order to conform the one or more photosensitive pixels to the modulated optical signal. In some implementations, modulation component 206 is capable of correlating the modulation of the optical signal with the modulation of the photosensitive pixels of sensor component 208 during time-of-flight operation (e.g., to allow distances from imaging system 202 to be calculated based on a reflected modulated optical signal received by the pixels of sensor component 208).

Sensor component 208 is a component capable of receiving a modulated optical signal after being reflected from an environment of imaging system 202. In some implementations, sensor component 208 may include an array of photosensitive pixels to receive the modulated optical signal. In one example, individual photosensitive pixels of the array may be individual image sensors. In such an example, a resulting 3D image may be a combination of the sensor images of the individual photosensitive pixels. In some implementations, a given photosensitive pixel is capable of converting a reflected modulated optical signal into an electrical signal. In some implementations, signals from the pixels may be processed into an image by one or more processing components of imaging system 202 and/or system controller 212. For example, in some implementations, the signals of the pixels of sensor component 208 may be provided to system controller 212 (e.g., functional component 214), and system controller 212 may generate an image (e.g., a 3D image) associated with the environment of imaging system 202 based on these signals.

Control component 210 is a component capable of controlling one or more components and/or functions of imaging system 202. For example, control component 210 may include a microcontroller configured to control one or more operations described above as being performed by emitter component 204, modulation component 206, and/or sensor component 208.

As noted above, in some implementations, system controller 212 may include a functional component 214 and a monitoring component 216. In some implementations, system controller 212 may include a microcontroller, a microprocessor, a digital signal processor, a field programmable gate array (FPGA), or the like.

Functional component 214 includes a component capable of generating, determining, or obtaining a 3D image associated with the environment of imaging system 202. For example, functional component 214 may receive a set of electrical signals generated by photosensitive pixels of sensor component 208 based on receiving a reflected modulated optical signal. Here, functional component 214 may, based on the electrical signals, determine one or more distances from imaging system 202 to objects within or elements of the environment of imaging system 202, and may generate a 3D image based on these distances. In some implementations, functional component 214 may be capable of providing the 3D image to monitoring component 216.

Monitoring component 216 includes a component capable of performing a functional safety check to determine a functional safety status associated with imaging system 202, as described herein. For example, monitoring component 216 may perform the functional safety check associated with imaging system 202 based on a 3D image obtained by imaging system 202 and a reference image associated with the environment of imaging system 202. In some implementations, as described herein, the reference image may be determined based on design data associated with the environment of imaging system 202.

The number and arrangement of devices and networks shown in FIG. 2 are provided as one or more examples. In practice, there may be additional devices, fewer devices, different devices, or differently arranged devices than those shown in FIG. 2. Furthermore, two or more devices shown in FIG. 2 may be implemented within a single device, or a single device shown in FIG. 2, may be implemented as multiple, distributed devices. Additionally, or alternatively, a set of devices (e.g., one or more devices) of domain 200 may perform one or more functions described as being performed by another set of devices of domain 200.

Figure 3:
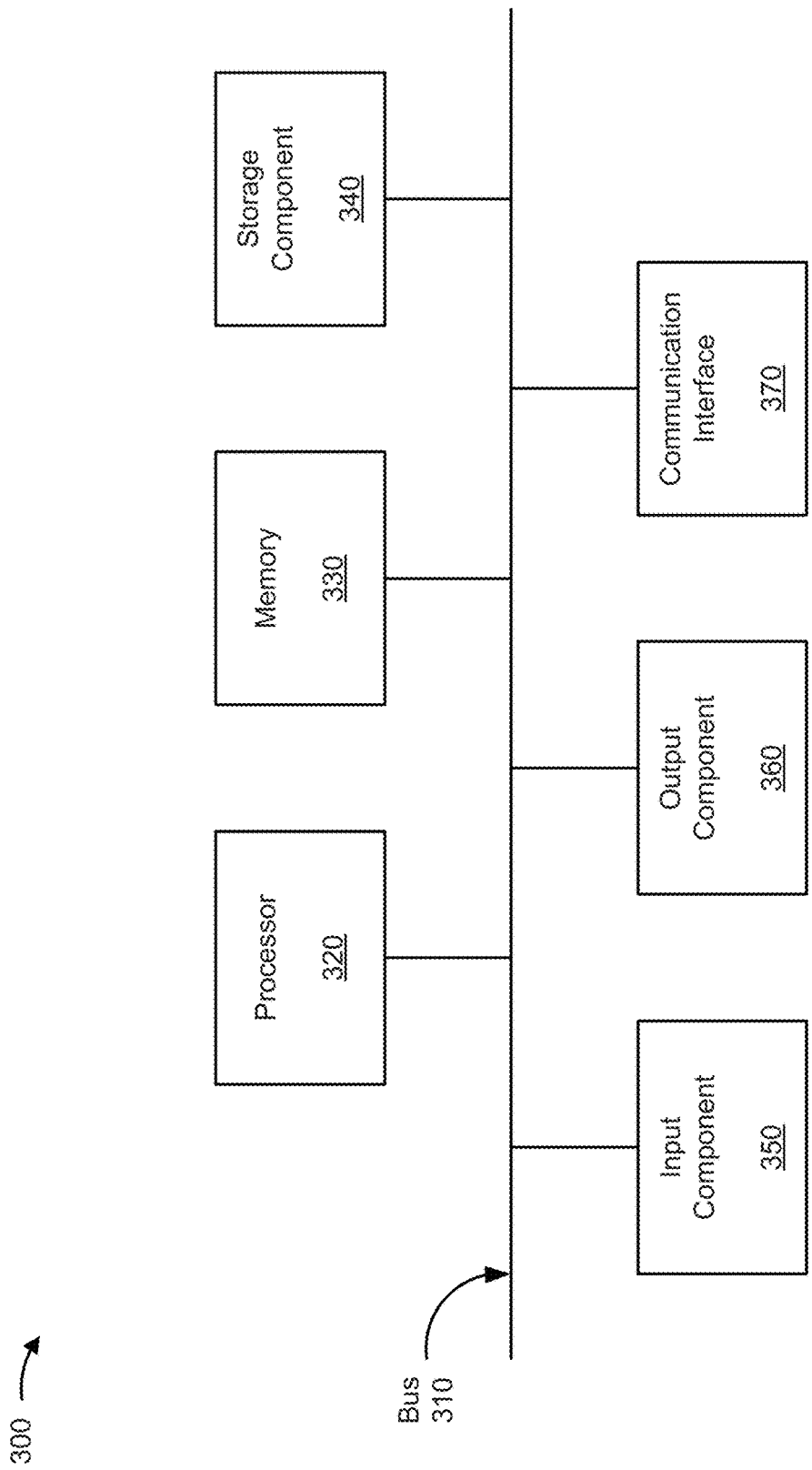
FIG. 3 is a diagram of example components of one or more devices of FIG. 2.

FIG. 3 is a diagram of example components of a device 300. Device 300 may correspond to one or more components of imaging system 202 (e.g., emitter component 204, modulation component 206, sensor component 208, and/or control component 210) and/or one or more components of system controller 212 (e.g., functional component 214 and/or monitoring component 216). In some implementations, one or more components of imaging system 202 and/or one or more components of system controller 212 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
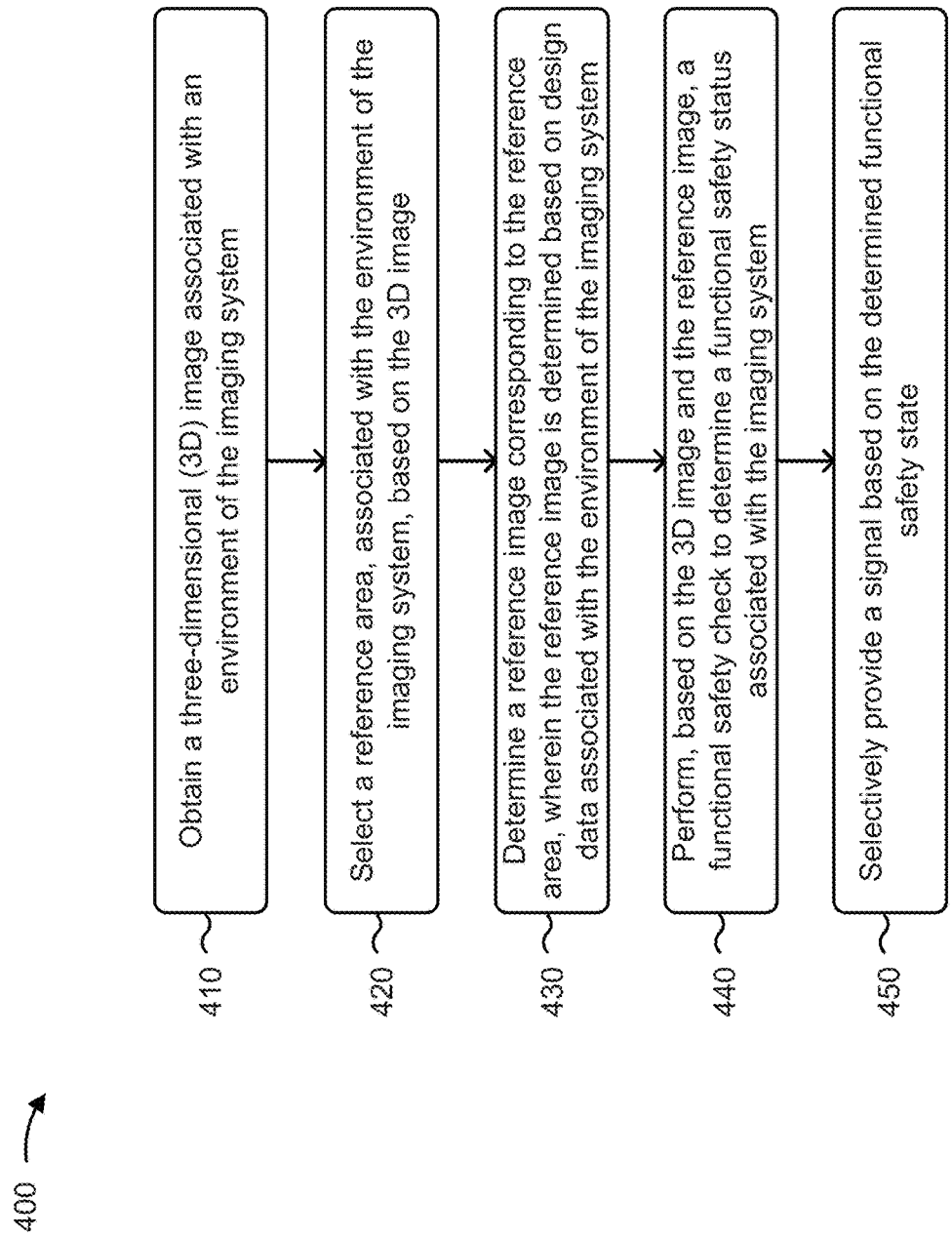
FIG. 4 is a flow chart of an example process for performing a functional safety check to determine a functional safety status associated with an imaging system based on an image obtained by the imaging system and a reference image associated with the environment of the imaging system.

FIG. 4 is a flow chart of an example process 400 for performing a functional safety check to determine a functional safety status associated with an imaging system based on an image obtained by the imaging system and a reference image associated with the environment of the imaging system. In some implementations, one or more process blocks of FIG. 4 may be performed by an imaging system (e.g., imaging system 202) and/or a monitoring component (e.g., monitoring component 216). In some implementations, one or more process blocks of FIG. 4 may be performed by another device or a group of devices separate from or including the monitoring component, such as another component of system controller 212 and/or the like.

As shown in FIG. 4, process 400 may include obtaining, by an imaging system, a 3D image associated with an environment of the imaging system (block 410). For example, the monitoring component e.g., using processor 320, memory 330, storage component 340, input component 350, output component 360, communication interface 370, and/or the like) may obtain a 3D image associated with an environment of the imaging system, as described above.

As further shown in FIG. 4, process 400 may include selecting a reference area, associated with the environment of the imaging system, based on the 3D image (block 420). For example, the monitoring component (e.g., using processor 320, memory 330, storage component 340, input component 350, output component 360, communication interface 370, and/or the like) may select a reference area, associated with the environment of the imaging system, based on the 3D image, as described above.

As further shown in FIG. 4, process 400 may include determining a reference image corresponding to the reference area (block 430). For example, the monitoring component (e.g., using processor 320, memory 330, storage component 340, input component 350, output component 360, communication interface 370, and/or the like) may determine a reference image corresponding to the reference area, as described above. In some aspects, the reference image is determined based on design data associated with the environment of the imaging system.

As further shown in FIG. 4, process 400 may include performing, based on the 3D image and the reference image, a functional safety check to determine a functional safety status associated with the imaging system (block 440). For example, the monitoring component (e.g., using processor 320, memory 330, storage component 340, input component 350, output component 360, communication interface 370, and/or the like) may perform, based on the 3D image and the reference image, a functional safety check to determine a functional safety status associated with the imaging system, as described above.

As further shown in FIG. 4, process 400 may include selectively providing a signal based on the determined functional safety state (block 450). For example, the monitoring component (e.g., using processor 320, memory 330, storage component 340, input component 350, output component 360, communication interface 370, and/or the like) may selectively provide a signal based on the determined functional safety state, as described above.

Process 400 may include additional implementations, such as any single implementation or any combination of implementations described below and/or in connection with one or more other processes described elsewhere herein.

In a first implementation, selecting the reference area comprises: performing object detection associated with the 3D image; determining, based on the object detection, that a candidate reference area of the 3D image is not obstructed; and selecting the reference area as at least a portion of the candidate reference area.

In a second implementation, alone or in combination with the first implementation, selecting the reference area comprises: performing object detection associated with the 3D image; determining, based on the object detection, that at least a portion of a first candidate reference area of the 3D image is obstructed; identifying a second candidate reference area of the 3D image based on determining that the at least a portion of the first candidate area is obstructed; determining that the second candidate reference area is not obstructed; and selecting the reference area as at least a portion of the second candidate reference area.

In a third implementation, in combination with the second implementation, the second candidate reference area of the 3D image is adjacent to an obstructed portion of the first candidate reference area.

In a fourth implementation, alone or in combination with one or more of the first through third implementations, performing the functional safety check comprises: comparing the reference image, corresponding to the reference area, and a portion of the 3D image corresponding to the reference area; and determining the functional safety status of the imaging system based on a result of comparing the reference image and the portion of the 3D image.

In a fifth implementation, in combination with the fourth implementation, comparing the reference image and the portion of the 3D image comprises: identifying, based on the reference image, a reference distance from the imaging system to a point in the reference area; identifying, based on the 3D image, a measured distance from the imaging system to the point in the reference area; and determining whether the reference distance matches the measured distance.

In a sixth implementation, alone or in combination with one or more of the fourth and fifth implementations, the reference area is a first reference area, the portion of the 3D image is a first portion of the 3D image, and the reference image is a first reference image. Here, when the result of comparing the first portion of the 3D image and the first reference image is indicative of a fault associated with the imaging system, the monitoring component may select a second reference area associated with the environment of the imaging system and determine a second reference image corresponding to the second reference area, the second reference image being determined based on design data associated with the environment of the imaging system. Here, the monitoring component may compare the second reference image and a second portion of the 3D image that corresponds to the second reference area, and the result of performing the functional safety check is further based on a result of comparing the second reference image and the second portion of the 3D image.

In a seventh implementation, alone or in combination with one or more of the first through sixth implementations, when the functional safety status is indicative of drift associated with the imaging system, the monitoring component performs drift correction associated with the imaging system.

In an eighth implementation, alone or in combination with one or more of the first through seventh implementations, when the functional safety status is indicative of a geometric misalignment associated with the imaging system, the monitoring component may perform a geometric misalignment correction associated with the imaging system.

In a ninth implementation, alone or in combination with one or more of the first through eighth implementations, when the functional safety status does not indicate a fault associated with the imaging system, the monitoring component, when selectively providing the signal, may provide a signal indicating that the imaging system has passed the functional safety check.

In a tenth implementation, alone or in combination with one or more of the first through ninth implementations, when the functional safety status indicates a need for calibration of the imaging system, the monitoring component may calibrate the imaging system based on the functional safety status.

In an eleventh implementation, alone or in combination with one or more of the first through tenth implementations, the functional safety check is to be performed automatically on a periodic basis.

In a twelfth implementation, alone or in combination with one or more of the first through eleventh implementations, the functional safety check is to be performed at startup of the imaging system.

In a thirteenth implementation, alone or in combination with one or more of the first through twelfth implementations, the monitoring component may cause the environment of the imaging system to be modified. Here, the functional safety status may indicate whether the environment, after being modified, matches an expected environment of the imaging system.

Although FIG. 4 shows example blocks of process 400, in some implementations, process 400 may include additional blocks, fewer blocks, different blocks, or differently arranged blocks than those depicted in FIG. 4, Additionally, or alternatively, two or more of the blocks of process 400 may be performed in parallel.

Some implementations described herein provide a monitoring component capable of performing a functional safety check in association with monitoring an entire signal path of an imaging system (i.e., monitoring that encompasses an optical signal path and an electrical signal path). In some implementations, the monitoring component described herein provides high diagnostic coverage related to various failure modes, meaning that the monitoring component provides diagnostic coverage for the entire signal path such that various possible failure modes (e.g., in different parts of the imaging system) are detectable. Furthermore, the monitoring component described herein enables numerous safety mechanisms (e.g., detection of a hardware fault of the imaging system, detection of a drift associated with the imaging system, detection of a geometric misalignment, detection of a transient hardware fault, and/or the like). Additionally, the monitoring component may enable (continuous or near-continuous) calibration of the imaging system during operation.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The measured specialized control hardware or software code used to implement these systems and/or methods is not limiting of the implementations. Thus, the operation and behavior of the systems and/or methods are described herein without reference to specific software code it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a monitoring component, a three-dimensional (3D) image associated with an environment of an imaging system;
   selecting, by the monitoring component, a reference area, associated with the environment of the imaging system, based on the 3D image;
   determining, by the monitoring component, a reference image corresponding to the reference area,
      wherein the reference image is determined based on design data associated with the environment of the imaging system;
   performing, by the monitoring component and based on the 3D image and the reference image, a functional safety check to determine a functional safety status associated with the imaging system; and
   selectively providing, by the monitoring component, a signal based on the determined functional safety status.

2. The method of claim 1, wherein selecting the reference area comprises:
   performing object detection associated with the 3D image;
   determining, based on the object detection, that a candidate reference area of the 3D image is not obstructed; and
   selecting the reference area as at least a portion of the candidate reference area.

3. The method of claim 1, wherein selecting the reference area comprises:
   performing object detection associated with the 3D image;
   determining, based on the object detection, that at least a portion of a first candidate reference area of the 3D image is obstructed;
   identifying a second candidate reference area of the 3D image based on determining that the at least a portion of the first candidate reference area is obstructed;
   determining that the second candidate reference area is not obstructed; and
   selecting the reference area as at least a portion of the second candidate reference area.

4. The method of claim 3, wherein the second candidate reference area of the 3D image is adjacent to an obstructed portion of the first candidate reference area.

5. The method of claim 1, wherein performing the functional safety check comprises:
   comparing the reference image, corresponding to the reference area, and a portion of the 3D image corresponding to the reference area; and
   determining the functional safety status of the imaging system based on a result of comparing the reference image and the portion of the 3D image.

6. The method of claim 5, wherein comparing the reference image and the portion of the 3D image comprises:
   identifying, based on the reference image, a reference distance from the imaging system to a point in the reference area;
   identifying, based on the 3D image, a measured distance from the imaging system to the point in the reference area; and
   determining whether the reference distance matches the measured distance.

7. The method of claim 5, wherein the reference area is a first reference area, the portion of the 3D image is a first portion of the 3D image, the reference image is a first reference image, and
   wherein, when the result of comparing the first portion of the 3D image and the first reference image is indicative of a fault associated with the imaging system, the method further comprises:
      selecting a second reference area associated with the environment of the imaging system;
      determining a second reference image corresponding to the second reference area,
         wherein the second reference image is determined based on the design data associated with the environment of the imaging system; and
      comparing the second reference image and a second portion of the 3D image that corresponds to the second reference area,
         wherein the result of performing the functional safety check is further based on a result of comparing the second reference image and the second portion of the 3D image.

8. The method of claim 1, wherein, when the functional safety status is indicative of drift associated with the imaging system, the method further comprises:
   performing drift correction associated with the imaging system.

9. The method of claim 1, wherein, when the functional safety status is indicative of a geometric misalignment associated with the imaging system, the method further comprises:
   performing a geometric misalignment correction associated with the imaging system.

10. The method of claim 1, wherein, when the functional safety status does not indicate a fault associated with the imaging system, selectively providing the signal comprises:
    providing a signal indicating that the imaging system has passed the functional safety check.

11. The method of claim 1, wherein, when the functional safety status indicates a need for calibration of the imaging system, the method further comprises:
    calibrating the imaging system based on the functional safety status.

12. The method of claim 1, wherein the functional safety check is to be performed automatically on a periodic basis.

13. The method of claim 1, wherein the functional safety check is to be performed at startup of the imaging system.

14. The method of claim 1, further comprising:
causing the environment of the imaging system to be modified,
wherein the functional safety status indicates whether the environment, after being modified, matches an expected environment of the imaging system.

15. A monitoring component, comprising:
one or more processors to:
obtain an image associated with an environment of a three-dimensional (3D) imaging system;
select a reference area, associated with the environment of the 3D imaging system, based on the image;
generate, based on design data associated with the environment of the 3D imaging system, a reference image corresponding to the reference area;
perform, based on the image and the reference image, a functional safety check to determine a functional safety status associated with the 3D imaging system; and
selectively provide a signal based on the determined functional safety status.

16. The monitoring component of claim 15, wherein the one or more processors, when selecting the reference area, are to:
perform object detection associated with the image;
determine, based on the object detection, that a candidate reference area of the image is not obstructed; and
select the reference area as at least a portion of the candidate reference area.

17. The monitoring component of claim 15, wherein the one or more processors, when selecting the reference area, are to:
perform object detection associated with the image;
determine, based on the object detection, that at least a portion of a first candidate reference area of the image is obstructed;
identify a second candidate reference area of the image based on determining that the at least a portion of the first candidate reference area is obstructed;
determine that the second candidate reference area is not obstructed; and
select the reference area as at least a portion of the second candidate reference area.

18. The monitoring component of claim 15, wherein the monitoring component, when performing the functional safety check, is to:
compare one or more distances, associated with the reference image, and one or more respective distances associated with a portion of the image corresponding to the reference area; and
determine the functional safety status of the imaging system based on a result of comparing the one or more distances associated with the reference image and the one or more respective distances associated with the portion of the image.

19. The monitoring component of claim 18, wherein the reference area is a first reference area, the portion of the image is a first portion of the image, the reference image is a first reference image, and
wherein, when the result of comparing the first portion of the image and the first reference image is indicative of a fault associated with the imaging system, the one or more processors are further to:
select a second reference area associated with the environment of the 3D imaging system;
determine a second reference image corresponding to the second reference area,
wherein the second reference image is determined based on the design data associated with the environment of the 3D imaging system; and
compare the second reference image and a second portion of the image that corresponds to the second reference area,
wherein the result of performing the functional safety check is further based on a result of comparing the second reference image and the second portion of the image.

20. A system, comprising:
an imaging system to generate an image associated with an environment of the imaging system; and
a monitoring component to:
select, based on the image, a reference area associated with the environment of the imaging system;
determine design data associated with the environment of the imaging system;
determine, based on the design data, a reference image corresponding to the reference area;
perform, based on the image and the reference image, a functional safety check to determine a functional safety status associated with the imaging system; and
selectively provide a signal based on the determined functional safety status.

* * * * *